Jan. 27, 1925.  1,524,558
C. W. KINCAID
INSULATION FOR CONDUCTORS IN SQUIRREL CAGE MOTORS
Filed Oct. 28, 1922

WITNESSES:
A.G. Schiefelbein
R.S. Harrison

INVENTOR
Charles W. Kincaid.
BY
Wesley G. Carr
ATTORNEY

Patented Jan. 27, 1925.

1,524,558

UNITED STATES PATENT OFFICE.

CHARLES W. KINCAID, OF CARRICK, PENNSYLVANIA, ASSIGNOR TO WESTINGHOUSE ELECTRIC & MANUFACTURING COMPANY, A CORPORATION OF PENNSYLVANIA.

INSULATION FOR CONDUCTORS IN SQUIRREL-CAGE MOTORS.

Application filed October 28, 1922. Serial No. 597,528.

*To all whom it may concern:*

Be it known that I, CHARLES W. KINCAID, a citizen of the United States, and a resident of Carrick, in the county of Allegheny and State of Pennsylvania, have invented a new and useful Improvement in Insulations for Conductors in Squirrel-Cage Motors, of which the following is a specification.

My invention relates to squirrel-cage rotors and has particular relation to the insulation of the slots thereof.

In motors of the squirrel-cage type it has been found that stray currents sometimes flow from the inductor bars through the core, causing the motor to become overheated and impairing its efficiency.

In squirrel-cage rotors, the slot insulation need not be good, merely a mechanical separation being enough, but, if the end rings are to be brazed onto the inductor bars, the insulation must stand the heat of brazing. Moreover, in assembling the rotor member, the inductor bars must be forced into the slots in order to be held tightly therein, and hence precautions must be taken to avoid scraping off the insulation when forcing the inductor bars into the slots.

The object of my invention is, therefore, to provide a simple, practical and comparatively inexpensive means for providing an insulated rotor winding and, at the same time, providing means for securing the inductor bars to the rotor core.

Figure 1:
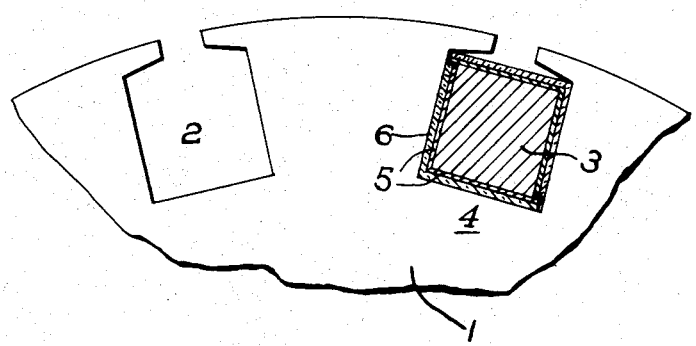
Figure 2:
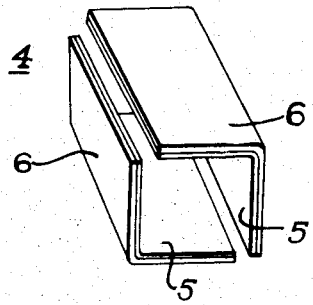

In the accompanying drawing:

Figure 1 is a fragmentary sectional view, in side elevation, of a rotor core having the bars attached thereto in accordance with my invention, and Fig. 2 is a perspective view of my improved slot-insulating means.

In Fig. 1 is shown a squirrel-cage rotor core 1 which is provided with a plurality of spaced openings or slots 2 for the reception of inductor bars 3. Within each of the slots is fitted my improved insulating member 4, preferably formed of two like sections, each of substantially L-shape, transversely, said sections, when brought together, constituting a tubular liner of rectangular form. Each section of the insulating member consists of a sheet-metal member 5, having an outer coating or covering 6 of any suitable insulating material which is preferably secured to the sheet-metal member by a suitable cement. When the end rings (not shown) are to be secured by brazing, a heat resistive insulating material, such as asbestos, is preferred. As the liners are in two sections, they may readily be inserted in the slots, and the inductor bars 3 may then be driven therein without damage to the insulation.

While I have shown and described a specific embodiment of my invention, it is obvious that changes in form and in the particular arrangement of its parts may be made within the scope of the invention. I desire, therefore, that the disclosed embodiment shall be regarded as illustrative only and that the appended claims shall be accorded the broadest construction consistent with the prior art.

I claim as my invention:

1. A member for the purpose set forth, comprising a sheet-metal liner formed of two substantially L-shaped longitudinally-disposed sections provided with a correspondingly shaped coating of insulation.

2. A member for the purpose set forth comprising a liner comprising substantially L-shaped longitudinally disposed metal sections provided with outer coverings of asbestos adhesively attached thereto.

3. A dynamo-electric machine having a slotted core member, windings having portions lying within said slots, and L-shaped metallic lining members interposed between said portions of the windings and the walls of the slots.

4. A dynamo-electric machine having a slotted core member, windings having portions lying within said slots, and L-shaped self supporting lining members interposed between said portions of the windings and the walls of the slots.

In testimony whereof, I have hereunto subscribed my name this 24th day of October, 1922.

CHARLES W. KINCAID.